April 30, 1963 G. E. COLE 3,087,850
PRESSURE SENSITIVE ADHESIVE TRANSFER TAPE
Filed May 12, 1958 2 Sheets-Sheet 1

INVENTOR.
Gerald E. Cole
BY
Wallenstein + Spangenberg
attys.

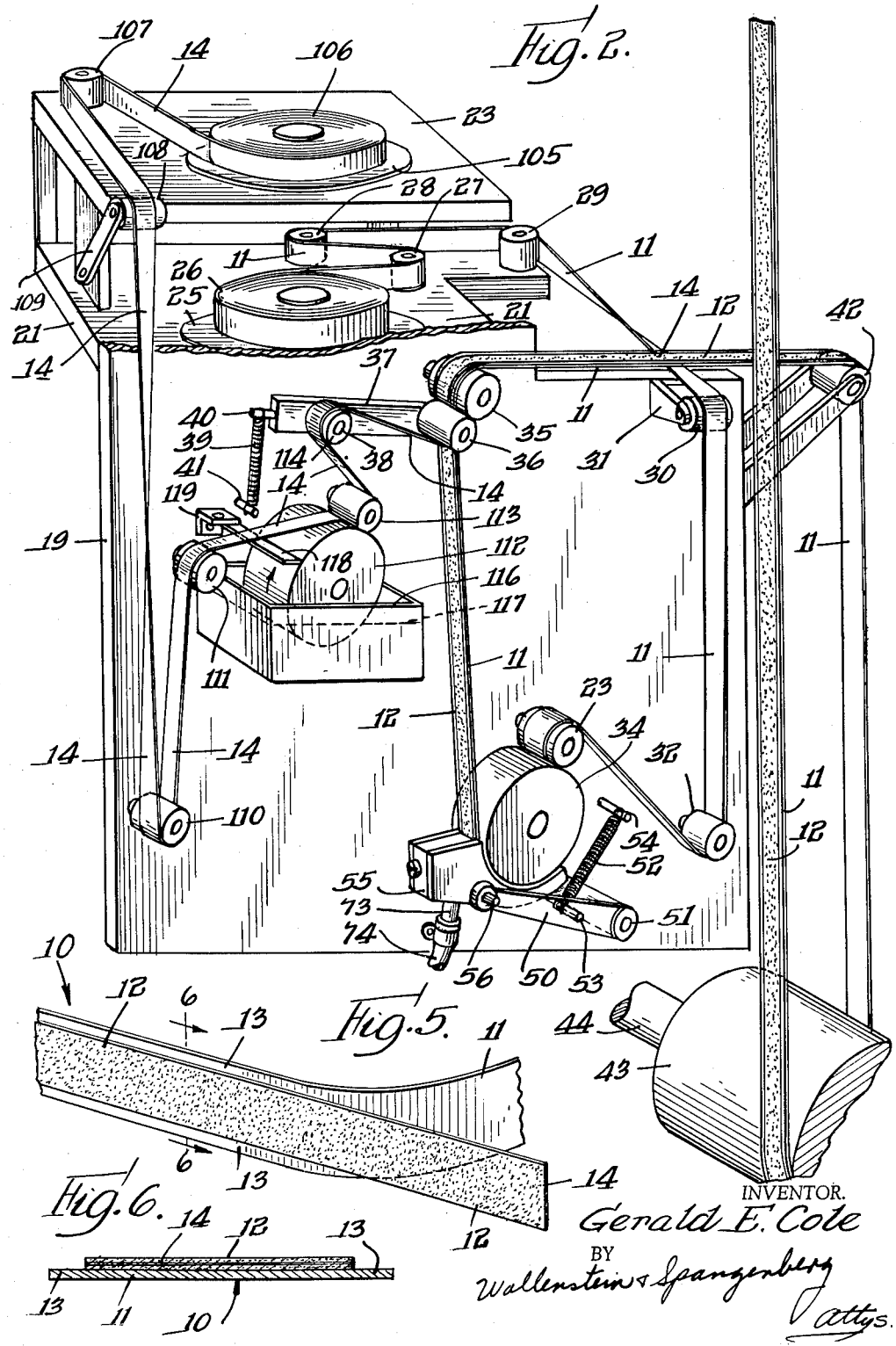

United States Patent Office 3,087,850
Patented Apr. 30, 1963

3,087,850
PRESSURE SENSITIVE ADHESIVE
TRANSFER TAPE
Gerald E. Cole, Highland Park, Ill., assignor to Kleen-Stik Products, Inc., Chicago, Ill., a corporation of Illinois
Filed May 12, 1958, Ser. No. 734,491
10 Claims. (Cl. 156—324)

The principal object of this invention is to provide a new and improved pressure sensitive adhesive transfer tape and a new and improved method and apparatus for producing the same.

Briefly, the pressure sensitive adhesive transfer tape of this invention for transferring and applying pressure sensitive adhesive to a desired surface includes an elongated smooth backing tape having release coatings on both sides thereof. An elongated layer of pressure sensitive adhesive is wet bonded to one side of the backing tape and, preferably, the width of the pressure sensitive adhesive layer is less than the width of the backing tape so as to provide the adhesive side of the backing tape with marginally exposed side edge portions. An elongated porous reinforcing strip is embedded and wet bonded in the elongated pressure sensitive adhesive layer.

The wet bonding of the pressure sensitive adhesive layer to said one side of the backing tape causes the adhesive layer to adhere thereto with greater force than to the other side of the backing tape whereby the pressure sensitive adhesive transfer tape may be readily rolled for handling purposes. The reinforcing strip, which is embedded and wet bonded in the pressure sensitive adhesive layer, forms an integral part of the adhesive layer and operates to reinforce and hold together the adhesive layer so as to provide resistance to creep in usage and to provide clean stripping of the reinforced pressure sensitive adhesive layer from said side of the backing tape when adhered to a surface to which the adhesive layer is to be transferred. The marginally exposed side edge portions of the adhesive side of the backing tape provide convenient finger gripping portions for the backing tape for stripping the same from the adhered reinforced pressure sensitive adhesive layer.

In making the pressure sensitive adhesive transfer tape of this invention, an elongated layer of a wet blend of pressure sensitive adhesive and solvent is applied to one side of an elongated smooth backing tape having a release coating on both sides thereof, and, preferably, the wet blend layer, which is wet bonded to the backing tape, is of a width less than the width of the backing tape to provide the backing tape with the convenient marginal finger gripping portions. In this respect, the backing tape is preferably passed over a roll and the wet blend layer is evenly applied to the backing tape on the roll by means of a doctor blade.

An elongated porous reinforcing strip is first saturated with a solvent capable of wetting the strip and compatible with the adhesive solvent, and, preferably, this is accomplished by passing the same over a roll which is rotatably mounted in a pool of the solvent, the desired amount of saturating solvent thus being applied to the reinforcing strip. The elongated solvent saturated strip is then superimposed over the elongated layer of the wet blend of pressure sensitive adhesive and solvent on the backing tape and is pressed thereinto so as to be completely immersed and wet bonded therein to reinforce and hold together the layer. By initially saturating the reinforcing strip with solvent, the reinforcing strip is more readily received in and saturated by the wet blend of adhesive and solvent on the backing tape so as to form a substantially integral part of the layer and most effectively reinforce the same. The solvent saturated reinforcing strip is preferably pressed into the wet blend layer of pressure sensitive adhesive and solvent on the backing strip by passing the same between a pair of rolls. The resultant product is then treated to drive off the solvent from the reinforced pressure sensitive adhesive layer.

Further objects of this invention reside in the details of construction of the pressure sensitive adhesive transfer tape and in the cooperative relationships between the component elements thereof, reside in the method steps for making the pressure sensitive adhesive transfer tape and in the cooperative relationships between said steps, and reside in the construction of the apparatus for making the pressure sensitive adhesive transfer tape and in the cooperative relationships between the component parts thereof.

Other objects and advantages of this invention will become apparent to those skilled in the art upon reference to the accompanying specification, claims and drawings in which:

FIG. 2 is a perspective view showing a portion of the apparatus looking from the right in FIG. 1.

FIG. 5 is a perspective view of the pressure sensitive adhesive transfer tape of this invention with a portion of the pressure sensitive adhesive layer being stripped from the backing tape.

FIG. 6 is an enlarged sectional view through the pressure sensitive adhesive transfer tape taken substantially along the line 6—6 of FIG. 5.

Figure 1:
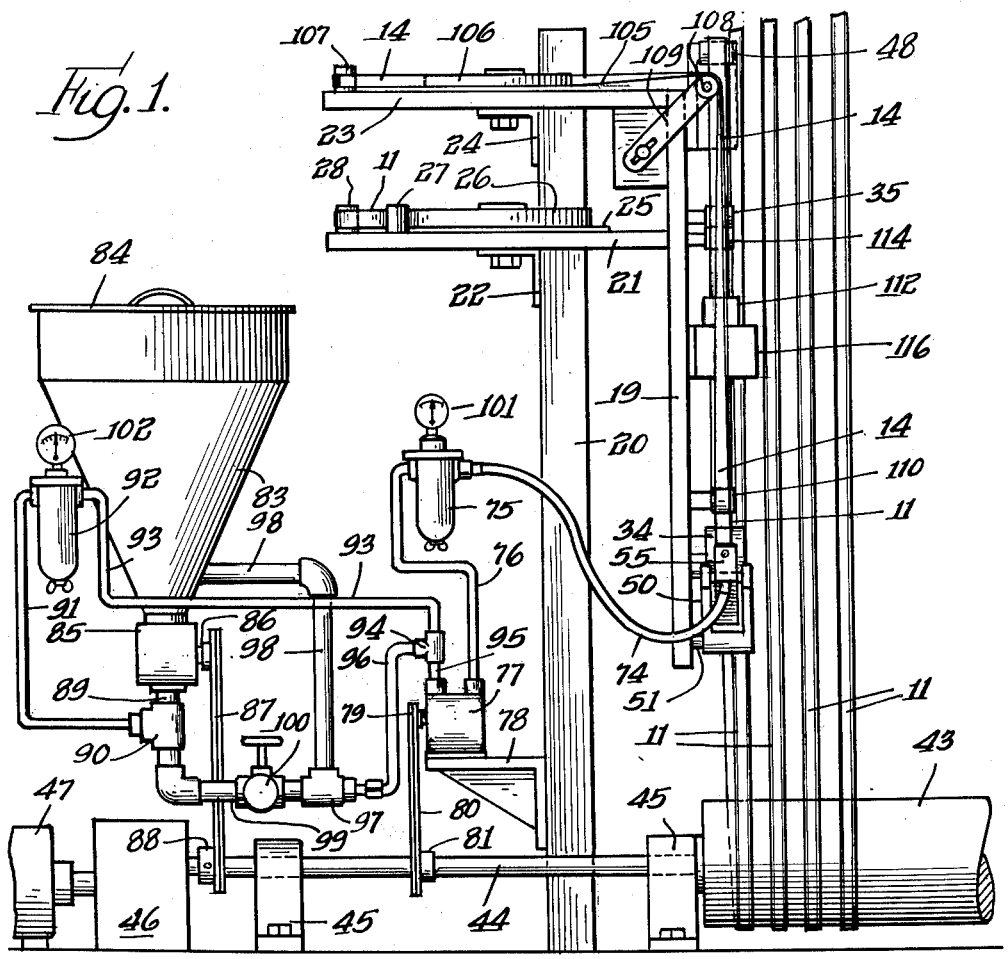
FIG. 1 is an elevational view of an apparatus for making the pressure sensitive adhesive transfer tape of this invention.
Figures 3, 4:
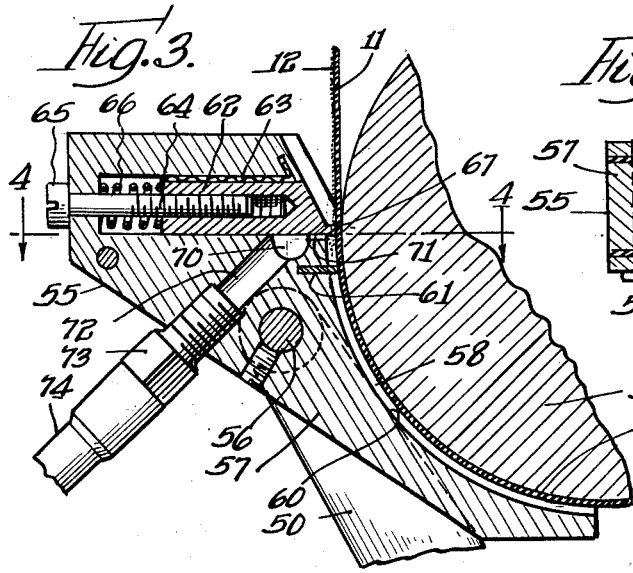
FIG. 3 is a vertical sectional view through the doctor blade head for applying the wet blend layer of pressure sensitive adhesive and solvent to the backing tape.
FIG. 4 is a horizontal sectional view through the doctor blade head taken substantially along the line 4—4 of FIG. 3.

Referring first to FIGS. 5 and 6, the pressure sensitive adhesive transfer tape of this invention is generally designated at 10 and it includes an elongated smooth backing tape 11 having release coatings on both sides thereof. The backing tape 11 may be formed of any suitable material such as holland cloth, cellophane, glassine, parchment paper, kraft paper or the like, the glassine and parchment paper being preferred. The release coatings may be of any desired type, especially good results being obtained by using silicone release coatings. The release coatings may be the same or different on the two sides of the backing tape 11. An elongated layer 12 of pressure sensitive adhesive is wet bonded to one side of the backing tape and, in this respect, any desired pressure sensitive adhesive materials may be utilized. Pressure sensitive adhesive materials formed from rubber-like polymers produce good results and especially good results are obtained by using a blend of polyvinyl ether, naphtha, toluene and ketone. This blend of pressure sensitive adhesive and solvent is applied as a wet blend to the backing tape and later is treated to drive off the solvent.

Preferably, the width of the pressure sensitive adhesive layer 12 is less than the width of the backing tape 11 so as to provide the adhesive side of the backing tape with marginally exposed side edge portions 13 which provide convenient finger gripping portions for the backing tape for stripping the same from the adhered pressure sensitive adhesive layer 12. An elongated porous reinforcing strip 14, which is of the same width as the pressure sensitive layer 12, is embedded and wet bonded in the elongated pressure sensitive adhesive layer. This porous reinforcing strip may be formed from any suitable thin, tough and porous material, and especially good results are obtained by using tissue paper or the like. The porous reinforcing strip 14 is first saturated with a suitable solvent capable of wetting the strip and compatible with the adhesive solvent, such as a blend consisting mainly of toluene, before it is pressed into the layer 12 of the wet blend of pressure sensitive adhesive and solvent. By so doing, the reinforcing strip 14 is more readily received in and saturated by the wet blend of adhesive and solvent on the backing tape so as to become completely immersed and wet bonded therein and to form a substantially integral part of the layer for most effectively reinforcing the same.

The wet bonding of the reinforced pressure sensitive adhesive layer 12 to said one side of the backing tape 11 causes the adhesive layer to adhere thereto with greater force than to the other side of the backing tape whereby the pressure sensitive adhesive transfer tape 10 may be readily rolled for handling purposes. When the reinforced pressure sensitive adhesive layer 12 is applied to a surface to which the adhesive layer is to be transferred, the marginal edges 13 of the backing tape 11 may be readily gripped to strip the backing tape 11 from the reinforced pressure sensitive adhesive layer 12 and the stripping is clean and uniform because of the substantially integral reinforcing of the layer 12 by the wet bonded reinforcing strip 14.

Referring now to FIGS. 1 and 2, the apparatus for making the pressure sensitive adhesive transfer tape of this invention includes a main frame 20 which carries horizontal platforms 21 and 23 by means of brackets 22 and 24, respectively. A vertical mounting plate 19 is carried by the platforms 21 and 23. A reel 25 is freely rotatably carried by the platform 21 and the reel 25 supports a roll 26 of the backing tape 11. The backing tape 11 is pulled from the roll 26 over guide rolls 27, 28 and 29 carried by the platform 21, a guide roll 30 carried by a bracket 31 secured to the mounting plate 19, guide rolls 32 and 33 carried by the mounting plate 19, a cylinder roll 34 carried by the mounting plate 19 and between a pair of rolls 35 and 36, the roll 35 being carried directly by the mounting plate 19 and the roll 36 being carried by a lever 37 pivoted at 38 to the mounting plate 19. The roll 36 is resiliently pressed against the roll 35 by means of a spring 39 connected at 40 to the lever 37 and at 41 to the mounting plate 19. The backing tape 11, with the reinforced adhesive layer 12 thereon, extends from the rolls 35 and 36 over a guide roll 42 suitably carried by a bracket and over a large roll 43 carried by a shaft 44 which is journaled for rotation at 45. The backing tape 11 with its adhesive layer 12 makes a number of passes over the roll 43 and an upper roll (not shown) for the purpose of driving out solvent from the reinforced pressure sensitive adhesive layer. The shaft 44 which rotates the roll 43 is operated through a gear reducer 46 by an electric motor 47. Thus, as the motor 47 is operated, the roll 43 is rotated for pulling the backing tape 11 over the aforementioned path from the reel 25. The motor 47 and gear reducer 46 are so arranged as to provide the proper speed of advance of the backing tape 11.

A lever mechanism 50 is pivoted at 51 to the mounting plate 19 and it is resiliently urged toward the cylinder roll 34 by a spring 52 connected at 53 to the lever mechanism 50 and at 54 to the mounting plate 19. A doctor blade head 55 is pivotally connected at 56 to the free end of the lever mechanism 50 so as to be urged against the cylinder roll 34 thereby. The doctor blade head 55 includes a center block 57, guide plates 58 and side plates 59 suitably secured together. The guide plates 58 have cylindrical edges which engage the backing tape 11 on the cylinder roll 34 and the guide plates 58 are spaced apart a distance to correspond to the width of the pressure sensitive adhesive layer to be applied to the backing tape 11. The block 57 between the guide plates 58 is provided with a cylindrical surface 60 which is concentric with the cylinder roll 34 and which is spaced from the backing tape 11 passing thereover. The block 57 is provided with a strip 61 extending between the guide plates 58 and which substantially engages the backing tape 11 between the guide plates. This strip 61 operates to form a pocket thereabove. Arranged within a cavity in the block 57 and extending between the guide plates 58 is a doctor blade member 62 which is firmly held in place therein by a corrugated spring member 63. The doctor blade member 62 adjustably carries a screw 64 having a head 65 engaging the block 57, and a spring 66 urges the doctor blade member 62 forwardly to an extent permitted by the adjustment of the screw 64. The inner end of the doctor blade member 62 is provided with a doctor blade 67 adjacent the backing tape 11. The spacing between the doctor blade 67 and the backing tape 11 is adjusted by means of the screw 64.

The block 57 is provided with a manifold 70 underneath the doctor blade member 62 and between the guide plates 58 and this manifold 70 communicates with the space above the strip 61 through a passage 71 which also extends between the guide plates 58. The wet blend of pressure sensitive adhesive and solvent which is applied to the backing tape 11 is supplied to the manifold 70 through a passage 72, a fitting 73 and a flexible hose 74. The hose 74 connects to a filter 75 which in turn is connected by a conduct 76 to the outlet side of a metering pump 77 carried by a bracket 78. The metering pump 77, which is of the positive displacement type, is driven by a sprocket wheel 79 connected by a chain 80 to a sprocket wheel 81 secured to the shaft 44. Thus, as the shaft 44 is rotated to drive the roll 43 for advancing the backing tape, the metering pump 77 is operated in timed relation thereto so as to supply the correct amount of the wet blend of pressure sensitive adhesive and solvent to the doctor blade head 55 commensurate with the rate of travel of the backing tape 11. In this way, the correct amount of the wet blend is supplied to the backing tape by the doctor blade head. The doctor blade 67 operates principally as a spreader for evenly distributing the wet blend on the backing tape 11 between the guide plates 58 so as to provide a uniform layer of the wet blend of uniform thickness and width on the backing tape.

The wet blend of pressure sensitive adhesive and solvent is supplied from a hopper 83 having a cover 84 by means of a pump 85 which is driven by a sprocket wheel 86 connected by a chain 87 to a sprocket wheel 88 secured to the shaft 44 driven by the gear reducer 46. The pump 85 discharges the wet blend from the hopper 83 through a conduit 89, a fitting 90, a conduit 91, a filter 92, a conduit 93, a fitting 94 and a conduit 95 to the inlet side of the metering pump 77. The fitting 94 is also connected through a conduit 96, a fitting 97 and a conduit 98 to the inlet of the pump 85. The pump 85 pumps an excess amount of the wet blend to the inlet of the metering pump 77 and the amount of wet blend not used by the metering pump 77 is discharged to the inlet side of the pump 85. As a result, adequate amounts of the wet blend are at all times supplied to the metering pump 77 and the metering pump 77 operates to supply the exact and correct amount of the wet blend to the doctor blade head 55. The fitting 90 may be connected to the fitting 97 by a conduit 99 having a valve 100 and this valve 100 may be manipulated for adjusting the amount of wet blend supplied to the fitting 94 on the inlet side of the metering pump 77. The filters 75 and 92 may be provided with pressure gauges 101 and 102 for indicating satisfactory operation of the pumps 77 and 85.

The platform 23 freely rotatably carries a reel 105 which in turn carries a roll 106 of the reinforcing strip 14, the reinforcing strip 14 extending from the roll over a guide roll 107 carried by the platform 23, a guide roll 108 carried by a bracket 109 and guide rolls 110 and 111 carried by the mounting plate 19. The reinforcing strip 14 also engages a roll 112 and is held in engagement therewith by a guide roll 113, the roll 112 and the guide roll 113 being carried by the mounting plate 19. The reinforcing strip 14 also extends over a guide roll 114 carried by the pivot 38 and over the roll 36 where it is embedded in the layer 12 of the wet blend of the pressure sensitive adhesive and solvent. Arranged below the roll 112 and carried by the mounting plate 19 is a container 116 which contains a pool of solvent 117, the roll 112 rotating in the pool of solvent. The solvent is carried by the roll 112 into contact with the reinforcing strip 14 engaging the same so as to completely saturate the reinforcing strip with the solvent. A blade 118 carried by a bracket 119, secured to the mounting plate 19, assists in regulating the amount of solvent supplied to the reinforcing strip 14 so as to completely saturate the reinforcing strip without applying appreciably excessive solvent thereto. The solvent saturated reinforcing strip 14 is superimposed over the wet blend layer 12 on the backing strip 11 at the rolls 35 and 36 and these rolls operate to embed and completely immerse the solvent saturated reinforcing strip 14 in the wet blend layer 12 so as to provide a wet bond and to make the reinforcing strip substantially an integral part of the wet blend layer 12. The reinforcing strip 14, being so embedded in the wet blend layer 12, causes the reinforcing strip 14 to be withdrawn from the freely rotating roll 106 over the aforementioned path.

The backing tape 11 with the reinforcing layer 12 of the wet blend of pressure sensitive adhesive and solvent is coursed over the lower roll 43 and the upper roll (not shown) with the adhesive layer on the outside, and in this coursing path the solvent in the reinforced pressure sensitive adhesive layer 12 is driven off. Suitable heating devices, or the like, adjacent the transfer tape as it courses the lower and upper rolls may be utilized to assist in driving off the solvent. When this is accomplished, the completed transfer tape 10 may be rolled into rolls for readily handling of the same.

While for purposes of illustration, one embodiment of this invention has been disclosed, other embodiments thereof may become apparent to those skilled in the art upon reference to this disclosure and, therefore, this invention is to be limited only by the scope of the appended claims.

I claim as my invention:

1. The method of making a pressure sensitive adhesive transfer tape comprising, applying to one side of an elongated smooth backing tape having release coatings on both sides thereof an elongated layer of a wet blend of pressure sensitive adhesive and solvent, saturating an elongated porous reinforcing strip with a solvent capable of wetting the strip and compatible with the adhesive solvent, pressing the elongated solvent saturated reinforcing strip into the elongated layer of the wet blend of the pressure sensitive adhesive and solvent so as to be completely immersed and wet bonded therein to reinforce the layer, and driving off the solvent from the reinforced layer of the wet blend of pressure sensitive adhesive and solvent.

2. The method of making a pressure sensitive adhesive transfer tape comprising, centrally applying to one side of an elongated smooth backing tape having release coatings on both sides thereof an elongated layer of a wet blend of pressure sensitive adhesive and solvent which is of less width than the width of the backing tape and providing said side of the backing tape with marginally exposed side edge portions, saturating an elongated porous reinforcing strip which is of the same width as the elongated layer of the wet blend of pressure sensitive adhesive and solvent on the backing strip with a solvent capable of wetting the strip and compatible with the adhesive solvent, pressing the elongated solvent saturated reinforcing strip into the elongated layer of the wet blend of pressure sensitive adhesive and solvent so as to be completely immersed and bonded therein to reinforce the layer, and driving off the solvent from the reinforced layer of the wet blend of pressure sensitive adhesive and solvent.

3. The method of making a pressure sensitive adhesive transfer tape comprising, passing an elongated smooth backing tape having release coatings on both sides thereof over a roll, centrally positioning a doctor blade of less width than the width of the backing tape adjacent to one side of the backing tape as it passes over the roll, supplying a wet blend of pressure sensitive adhesive and solvent to the doctor blade to apply an elongated layer of the same centrally to said side of the backing tape and providing said side of the backing tape with marginally exposed side edge portions, saturating an elongated porous reinforcing strip which is of the same width as the elongated layer of the wet blend of pressure sensitive adhesive and solvent on the backing strip with a solvent capable of wetting the strip and compatible with the adhesive solvent, pressing the elongated solvent saturated reinforcing strip into the elongated layer of the wet blend of pressure sensitive adhesive and solvent so as to be completely immersed and bonded therein to reinforce the layer, and driving off the solvent from the reinforced layer of the wet blend of pressure sensitive adhesive and solvent.

4. The method of making a pressure sensitive adhesive transfer tape comprising, passing an elongated smooth backing tape having release coatings on both sides thereof over a roll, positioning a doctor blade adjacent to one side of the backing tape as it passes over the roll, supplying a wet blend of pressure sensitive adhesive and solvent to the doctor blade to apply an elongated layer of the same to said side of the backing tape, saturating an elongated porous reinforcing strip with a solvent capable of wetting the strip and compatible with the adhesive solvent, pressing the elongated solvent saturated reinforcing strip into the elongated layer of the wet blend of the pressure sensitive adhesive and solvent so as to be completely immersed and wet bonded therein to reinforce the layer, and driving off the solvent from the reinforced layer of the wet blend of pressure sensitive adhesive and solvent.

5. The method of making a pressure sensitive adhesive transfer tape comprising, applying to one side of an elongated smooth backing tape having release coatings on both sides thereof an elongated layer of a wet blend of pressure sensitive adhesive and solvent, passing an elongated porous reinforcing strip over a roll turning in a pool of solvent capable of wetting the strip and compatible with the adhesive solvent for saturating the reinforcing strip with the solvent, pressing the elongated solvent saturated reinforcing strip into the elongated layer of the wet blend of the pressure sensitive adhesive and solvent so as to be completely immersed and wet bonded therein to reinforce the layer, and driving off the solvent from the reinforced layer of the wet blend of pressure sensitive adhesive and solvent.

6. The method of making a pressure sensitive adhesive transfer tape comprising, applying to one side of an elongated smooth backing tape having release coatings on both sides thereof an elongated layer of a wet blend of pressure sensitive adhesive and solvent, saturating an elongated porous reinforcing strip with a solvent capable of wetting the strip and compatible with the adhesive solvent, superimposing the elongated solvent saturated reinforcing strip over the elongated layer of the wet blend of pressure sensitive adhesive and solvent on the backing tape and passing the same between a pair of rolls for pressing the elongated solvent saturated reinforcing strip into the elongated layer of the wet blend of the pressure sensitive adhesive and solvent so as to be completely immersed and wet bonded therein to reinforce the layer, and driving off the solvent from the reinforced layer of the wet blend of pressure sensitive adhesive and solvent.

7. The method of making a pressure sensitive adhesive transfer tape comprising, applying to one side of an elongated smooth backing tape having release coatings on both sides thereof an elongated layer of a wet blend of pressure sensitive adhesive and solvent, passing an elongated reinforcing strip over a roll turning in a pool of solvent capable of wetting the strip and compatible with the adhesive solvent for saturating the reinforcing strip with the solvent, superimposing the elongated solvent saturated reinforcing strip over the elongated layer of the wet blend of pressure sensitive adhesive and solvent on the backing tape and passing the same between a pair of rolls for pressing the elongated solvent saturated reinforcing strip into the elongated layer of the wet blend of the pressure sensitive adhesive and solvent so as to be completely immersed and wet bonded therein to reinforce the layer, and driving off the solvent from the reinforced layer of the wet blend of pressure sensitive adhesive and solvent.

8. The method of making a pressure sensitive adhesive transfer tape comprising, passing an elongated smooth backing tape having release coatings on both sides thereof over a roll, positioning a doctor blade adjacent to one side of the backing tape as it passes over the roll, supplying a wet blend of pressure sensitive adhesive and solvent to the doctor blade to apply an elongated layer of the same to said side of the backing tape, saturating an elongated porous reinforcing strip with a solvent capable of wetting the strip and compatible with the adhesive solvent, superimposing the elongated solvent saturated reinforcing strip over the elongated layer of the wet blend of pressure sensitive adhesive and solvent on the backing tape and passing the same between a pair of rolls for pressing the elongated solvent saturated reinforcing strip into the elongated layer of the wet blend of the pressure sensitive adhesive and solvent so as to be completely immersed and wet bonded therein to reinforce the layer, and driving off the solvent from the reinforced layer of the wet blend of pressure sensitive adhesive and solvent.

9. The method of making a pressure sensitive adhesive transfer tape comprising, passing an elongated smooth backing tape having release coatings on both sides thereof over a roll, positioning a doctor blade adjacent to one side of the backing tape as it passes over the roll, supplying a wet blend of pressure sensitive adhesive and solvent to the doctor blade to apply an elongated layer of the same to said side of the backing tape, passing an elongated porous reinforcing strip over a roll turning in a pool of solvent capable of wetting the strip and compatible with the adhesive solvent for saturating the reinforcing strip with the solvent, pressing the elongated solvent saturated reinforcing strip into the elongated layer of the wet blend of the pressure sensitive adhesive and solvent so as to be completely immersed and wet bonded therein to reinforce the layer, and driving off the solvent from the reinforced layer of the wet blend of pressure sensitive adhesive and solvent.

10. The method of making a pressure sensitive adhesive transfer tape comprising, passing an elongated smooth backing tape having release coatings on both sides thereof over a roll, positioning a doctor blade adjacent to one side of the backing tape as it passes over the roll, supplying a wet blend of pressure sensitive adhesive and solvent to the doctor blade to apply an elongated layer of the same to said side of the backing tape, passing an elongated porous reinforcing strip over a roll turning in a pool of solvent capable of wetting the strip and compatible with the adhesive solvent for saturating the reinforcing strip with the solvent, superimposing the elongated solvent saturated reinforcing strip over the elongated layer of the wet blend of pressure sensitive adhesive and solvent on the backing tape and passing the same between a pair of rolls for pressing the elongated solvent saturated reinforcing strip into the elongated layer of the wet blend of the pressure sensitive adhesive and solvent so as to be completely immersed and wet bonded therein to reinforce the layer, and driving off the solvent from the reinforced layer of the wet blend of pressure sensitive adhesive and solvent.

References Cited in the file of this patent

UNITED STATES PATENTS

| | | |
|---|---|---|
| 2,191,704 | Bennett | Feb. 27, 1940 |
| 2,206,899 | Kellgren | July 9, 1940 |
| 2,359,314 | Klein et al. | Oct. 3, 1944 |
| 2,364,001 | Schieman | Nov. 28, 1944 |
| 2,442,876 | Pearson | June 8, 1948 |
| 2,463,244 | Carter | Mar. 1, 1949 |
| 2,532,011 | Dahlquist et al. | Nov. 28, 1950 |
| 2,557,227 | Kemp | June 19, 1951 |
| 2,607,712 | Sturken | Aug. 19, 1952 |
| 2,674,556 | Pahl et al. | Apr. 6, 1954 |
| 2,690,206 | Mueller | Sept. 28, 1954 |
| 2,739,919 | Artzt | Mar. 27, 1956 |
| 2,750,030 | Tierney | June 12, 1956 |
| 2,946,370 | Muttera | July 26, 1960 |